United States Patent
Kazmi et al.

(10) Patent No.: US 8,929,311 B2
(45) Date of Patent: Jan. 6, 2015

(54) SIGNALING FOR LEGACY TERMINAL OPERATION IN HARMONIZED BANDS

(75) Inventors: Muhammad Kazmi, Bromma (SE); Tao Cui, Upplands Väsby (SE); Erika Tejedor, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 13/395,130

(22) PCT Filed: Jan. 13, 2012

(86) PCT No.: PCT/SE2012/050026
§ 371 (c)(1),
(2), (4) Date: Mar. 9, 2012

(87) PCT Pub. No.: WO2012/108811
PCT Pub. Date: Aug. 16, 2012

(65) Prior Publication Data
US 2012/0202487 A1    Aug. 9, 2012

Related U.S. Application Data

(60) Provisional application No. 61/440,628, filed on Feb. 8, 2011.

(51) Int. Cl.
*H04W 4/00* (2009.01)
*H04W 48/10* (2009.01)
*H04W 88/10* (2009.01)

(52) U.S. Cl.
CPC .............. *H04W 48/10* (2013.01); *H04W 88/10* (2013.01)
USPC ........ 370/329; 370/328; 370/437; 455/432.1; 455/450

(58) Field of Classification Search
USPC ............. 455/432.1, 432.2, 434, 435.1, 435.2, 455/446–451, 452.1, 452.2, 454, 439–444; 370/331, 252, 328, 329, 432, 437
See application file for complete search history.

(56) References Cited

U.S. PATENT DOCUMENTS

| | | | |
|---|---|---|---|
| 6,374,109 B1* | 4/2002 | Shaheen et al. | 455/434 |
| 2008/0192719 A1* | 8/2008 | So et al. | 370/343 |
| 2010/0317356 A1* | 12/2010 | Roessel et al. | 455/450 |
| 2011/0007778 A1* | 1/2011 | Kishiyama et al. | 375/133 |
| 2011/0151875 A1* | 6/2011 | Park et al. | 455/436 |

(Continued)

FOREIGN PATENT DOCUMENTS

WO    2012/023895 A1    2/2012

OTHER PUBLICATIONS

3rd Generation Partnership Project. "Inter-band Carrier Aggregation Scenarios." TSG-RAN Working Group 4 (Radio) meeting Ad Hoc#1, R4-100089, Sophia Antipolis, France, Jan. 18-22, 2010.

(Continued)

*Primary Examiner* — Magdi Elhag
(74) *Attorney, Agent, or Firm* — Murphy, Bilak & Homiller, PLLC

(57) ABSTRACT

Network nodes and methods therein for enabling use, in a cell, of different types of mobile terminals. A method in a network node (501) associated with the cell comprises supporting (302), at least part of, at least two frequency bands having a respective predefined frequency band indicator in said cell. The method further comprises signaling (304) information associated with said at least two frequency bands to UEs in the cell, thus enabling use of UEs operating in a respective different one of said at least two frequency bands in the cell.

34 Claims, 15 Drawing Sheets

(56) References Cited

U.S. PATENT DOCUMENTS

| | | | | |
|---|---|---|---|---|
| 2011/0243083 | A1* | 10/2011 | Zhang et al. | 370/329 |
| 2012/0113935 | A1* | 5/2012 | Lindoff et al. | 370/329 |
| 2013/0051328 | A1* | 2/2013 | Chandra | 370/328 |
| 2013/0053103 | A1* | 2/2013 | Kim et al. | 455/561 |
| 2013/0155991 | A1* | 6/2013 | Kazmi et al. | 370/329 |

OTHER PUBLICATIONS

Unknown, Author. "3rd Generation Partnership Project; Technical Specification Group Services and System Aspects; Telecommunications management; Evolved Universal Terrestrial Radio Access Network (E-UTRAN) Network Resource Model (NRM) Integration Reference Point (IRP): Information Service (IS) (Release 10)." 3GPP TS 32.762 V10.0.0. Jun. 2010.

Unknown, Author. "3rd Generation Partnership Project; Technical Specification Group Radio Access Network; Evolved Universal Terrestrial Radio Access (E-UTRA); Base Station (BS) radio transmission and reception (Release 10)." 3GPP TS 36.104 V10.0.0. Sep. 2010.

* cited by examiner

| E-UTRA Operating Band | Uplink (UL) operating band BS receive UE transmit $F_{UL\_low} - F_{UL\_high}$ | Downlink (DL) operating band BS transmit UE receive $F_{DL\_low} - F_{DL\_high}$ | Duplex Mode |
|---|---|---|---|
| 1 | 1920 MHz – 1980 MHz | 2110 MHz – 2170 MHz | FDD |
| 2 | 1850 MHz – 1910 MHz | 1930 MHz – 1990 MHz | FDD |
| 3 | 1710 MHz – 1785 MHz | 1805 MHz – 1880 MHz | FDD |
| 4 | 1710 MHz – 1755 MHz | 2110 MHz – 2155 MHz | FDD |
| 5 | 824 MHz – 849 MHz | 869 MHz – 894 MHz | FDD |
| 6[1] | 830 MHz – 840 MHz | 875 MHz – 885 MHz | FDD |
| 7 | 2500 MHz – 2570 MHz | 2620 MHz – 2690 MHz | FDD |
| 8 | 880 MHz – 915 MHz | 925 MHz – 960 MHz | FDD |
| 9 | 1749.9 MHz – 1784.9 MHz | 1844.9 MHz – 1879.9 MHz | FDD |
| 10 | 1710 MHz – 1770 MHz | 2110 MHz – 2170 MHz | FDD |
| 11 | 1427.9 MHz – 1447.9 MHz | 1475.9 MHz – 1495.9 MHz | FDD |
| 12 | 699 MHz – 716 MHz | 729 MHz – 746 MHz | FDD |
| 13 | 777 MHz – 787 MHz | 746 MHz – 756 MHz | FDD |
| 14 | 788 MHz – 798 MHz | 758 MHz – 768 MHz | FDD |
| 15 | Reserved | Reserved | FDD |
| 16 | Reserved | Reserved | FDD |
| 17 | 704 MHz – 716 MHz | 734 MHz – 746 MHz | FDD |
| 18 | 815 MHz – 830 MHz | 860 MHz – 875 MHz | FDD |
| 19 | 830 MHz – 845 MHz | 875 MHz – 890 MHz | FDD |
| 20 | 832 MHz – 862 MHz | 791 MHz – 821 MHz | FDD |
| 21 | 1447.9 MHz – 1462.9 MHz | 1495.9 MHz – 1510.9 MHz | FDD |
| 22 | 3410 MHz – 3490 MHz | 3510 MHz – 3590 MHz | FDD |
| 23 | 2000 MHz – 2020 MHz | 2180 MHz – 2200 MHz | FDD |
| 24 | 1626.5 MHz – 1660.5 MHz | 1525 MHz – 1559 MHz | FDD |
| 25 | 1850 MHz – 1915 MHz | 1930 MHz – 1995 MHz | FDD |
| ... | | | |
| 33 | 1900 MHz – 1920 MHz | 1900 MHz – 1920 MHz | TDD |
| 34 | 2010 MHz – 2025 MHz | 2010 MHz – 2025 MHz | TDD |
| 35 | 1850 MHz – 1910 MHz | 1850 MHz – 1910 MHz | TDD |
| 36 | 1930 MHz – 1990 MHz | 1930 MHz – 1990 MHz | TDD |
| 37 | 1910 MHz – 1930 MHz | 1910 MHz – 1930 MHz | TDD |
| 38 | 2570 MHz – 2620 MHz | 2570 MHz – 2620 MHz | TDD |
| 39 | 1880 MHz – 1920 MHz | 1880 MHz – 1920 MHz | TDD |
| 40 | 2300 MHz – 2400 MHz | 2300 MHz – 2400 MHz | TDD |
| 41 | 2496 MHz   2690 MHz | 2496 MHz – 2690 MHz | TDD |
| 42 | 3400 MHz – 3600 MHz | 3400 MHz – 3600 MHz | TDD |
| 43 | 3600 MHz – 3800 MHz | 3600 MHz – 3800 MHz | TDD |
| Note 1: Band 6 is not applicable | | | |

Figure 2

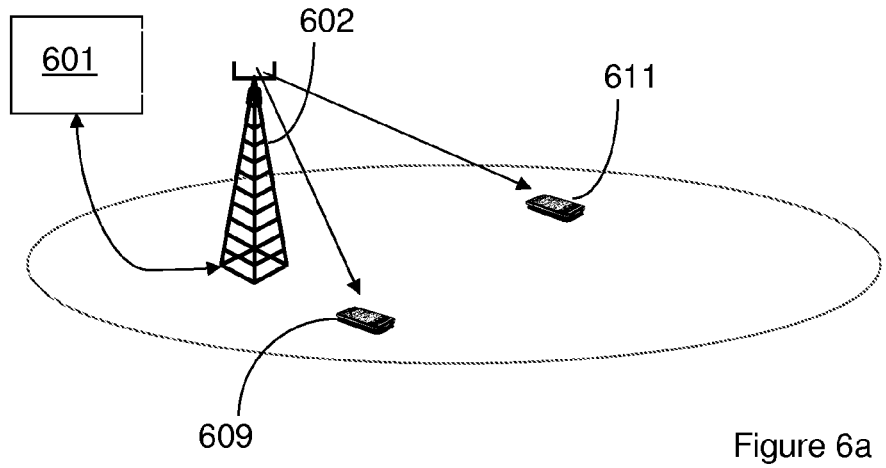
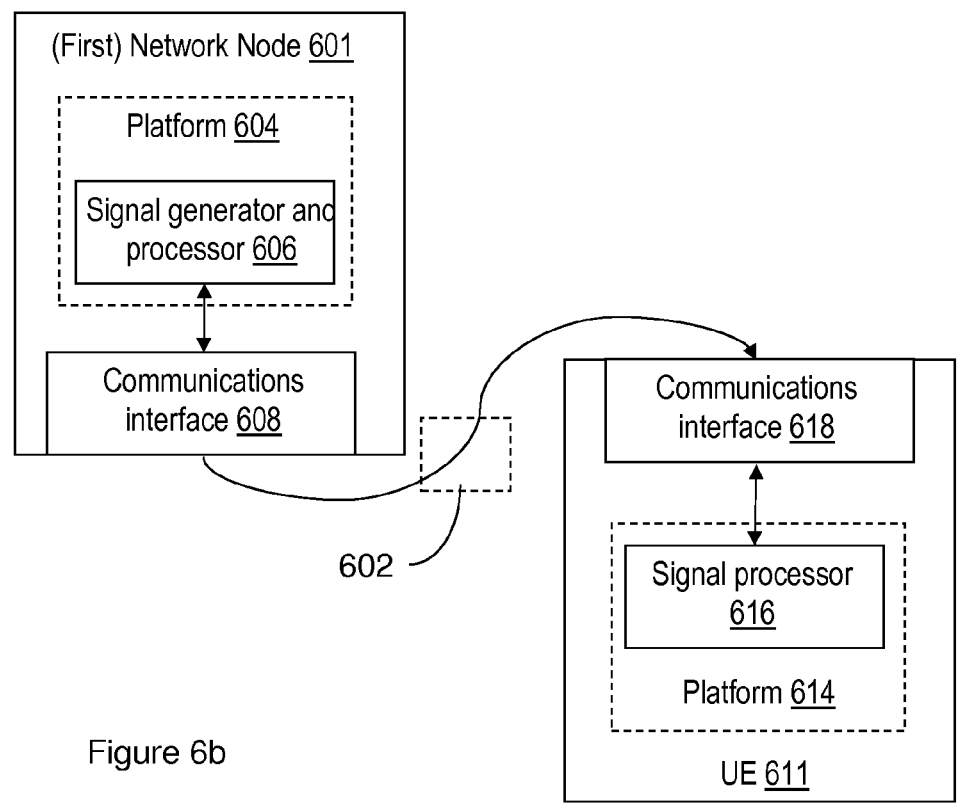
Figure 6a
Figure 6b

```
ASN1START

SystemInformationBlockType1 ::=     SEQUENCE {
    cell_AccessRelatedInfo              SEQUENCE {
        plmn_IdentityList                   PLMN IdentityList,
            trackingAreaCode                    TrackingAreaCode,
            cellIdentity                        CellIdentity,
            cellBarred                          ENUMERATED {barred, notBarred},
            intraFreqReselection                ENUMERATED {allowed, notAllowed},
            csg-Indication                      BOOLEAN,
            csg-Identity                        CSG-Identity       ...OPTIONAL    Need OR
    },
    cellSelectionInfo                   SEQUENCE {
        q-RxLevMin                          Q-RxLevMin,
        q-RxLevMinOffset                    INTEGER (1..8)         OPTIONAL    -- Need OP
    },
    p-Max                               P-Max                      OPTIONAL,   -- Need OP
    freqBandIndicator                   INTEGER (1..64),
→   schedulingInfoList                  SchedulingInfoList,
    tdd-Config                          TDD-Config                 OPTIONAL,   -- Cond TDD
    si-WindowLength                     ENUMERATED {
                                            ms1, ms2, ms5, ms10, ms15, ms20,
                                            ms40},
    systemInfoValueTag                  INTEGER (0..31),
    nonCriticalExtension                SystemInformationBlockType1-v890-IEs
        OPTIONAL
}

SystemInformationBlockType1-v890-IEs::= SEQUENCE {
    lateNonCriticalExtension            OCTET STRING               OPTIONAL,   -- Need OP
    nonCriticalExtension                SystemInformationBlockType1-v920-IEs    OPTIONAL
}

SystemInformationBlockType1-v920-IEs ::=    SEQUENCE {
    ims-EmergencySupport-r9             ENUMERATED {true}          OPTIONAL,   -- Need OR
    cellSelectionInfo-v920              CellSelectionInfo-v920     OPTIONAL,   -- Need OP
    nonCriticalExtension                SEQUENCE {}                OPTIONAL    -- Need OP
}

PLMN-IdentityList ::=                   SEQUENCE (SIZE (1..6)) OF PLMN-IdentityInfo PLMN-IdentityInfo ::=                   SEQUENCE {
    plmn-Identity                           PLMN-Identity,
    cellReservedForOperatorUse              ENUMERATED {reserved, notReserved}
}

→ SchedulingInfoList ::= SEQUENCE (SIZE (1..maxSI-Message)) OF SchedulingInfo

SchedulingInfo ::=   SEQUENCE {
    si-Periodicity                      ENUMERATED {
                                            rf8, rf16, rf32, rf64, rf128, rf256, rf512},
    sib-MappingInfo                     SIB-MappingInfo
}

SIB-MappingInfo ::= SEQUENCE (SIZE (0..maxSIB-1)) OF SIB-Type

SIB Type ::=                        ENUMERATED {
                                        sibType3, sibType4, sibType5, sibType6,
                                        sibType7, sibType8, sibType9, sibType10,
                                        sibType11, sibType12-v920, sibType13-v920, spare5,
                                        spare4, spare3, spare2, spare1, ...}

CellSelectionInfo-v920 ::=          SEQUENCE {
    q-QualMin-r9                        Q-QualMin-r9,
    q-QualMinOffset-r9                  INTEGER (1..8)             OPTIONAL
            Need OP
}

-- ASN1STOP
```

*SystemInformationBlockType1 message*  Figure 9 (prior art)

```
-- ASN1START

SystemInformationBlockType2 ::=    SEQUENCE {
    ac-BarringInfo                     SEQUENCE {
        ac-BarringForEmergency             BOOLEAN,
        ac-BarringForMO-Signalling         AC-BarringConfig            OPTIONAL,   --
            Need OP
        ac-BarringForMO-Data               AC-BarringConfig            OPTIONAL
            Need OP
    }                                                                  OPTIONAL,   -- Need OP
    radioResourceConfigCommon          RadioResourceConfigCommonSIB,
    ue-TimersAndConstants              UE-TimersAndConstants,
    freqInfo                           SEQUENCE {
        ul-CarrierFreq                     ARFCN-ValueEUTRA            OPTIONAL,   --
            Need OP
        ul-Bandwidth                       ENUMERATED {n6, n15, n25, n50, n75, n100}
                                                                       OPTIONAL,   -- Need OP
        additionalSpectrumEmission         AdditionalSpectrumEmission
    },
    mbsfn-SubframeConfigList           MBSFN-SubframeConfigList         OPTIONAL,   --
            Need OR
    timeAlignmentTimerCommon           TimeAlignmentTimer,
    ...,
    lateNonCriticalExtension           OCTET STRING                    OPTIONAL,   -- Need OP
    [[ ssac-BarringForMMTEL-Voice-r9     AC-BarringConfig              OPTIONAL,   --
            Need OP
       ssac-BarringForMMTEL-Video-r9     AC-BarringConfig              OPTIONAL    --
            Need OP
    ]],
    [[ ac-BarringForCSFB-r10             AC-BarringConfig              OPTIONAL    -- Need OP
    ]]
}

AC-BarringConfig ::=               SEQUENCE {
    ac-BarringFactor                   ENUMERATED {
                                           p00, p05, p10, p15, p20, p25, p30, p40,
                                           p50, p60, p70, p75, p80, p85, p90, p95},
    ac-BarringTime                     ENUMERATED {s4, s8, s16, s32, s64, s128, s256, s512},
    ac-BarringForSpecialAC             BIT STRING (SIZE(5))
}

MBSFN-SubframeConfigList ::=       SEQUENCE (SIZE (1..maxMBSFN-Allocations)) OF MBSFN-
            SubframeConfig

-- ASN1STOP
```

*SystemInformationBlockType2 information element*   Figure 10 (prior art)

```
SystemInformationBlockType1 ::=     SEQUENCE {
    cellAccessRelatedInfo               SEQUENCE {
        plmn-IdentityList                   PLMN-IdentityList,
        trackingAreaCode                    TrackingAreaCode,
        cellIdentity                        CellIdentity,
        cellBarred                          ENUMERATED {barred, notBarred},
        intraFreqReselection                ENUMERATED {allowed, notAllowed},
        csg-Indication                      BOOLEAN,
        csg-Identity                        CSG-Identity           OPTIONAL    -- Need OR
    },
    cellSelectionInfo                   SEQUENCE {
        q-RxLevMin                          Q-RxLevMin,
        q-RxLevMinOffset                    INTEGER (1..8)         OPTIONAL    -- Need OP
    },
    p-Max                               P-Max                      OPTIONAL,   -- Need OP
    freqBandIndicator                   INTEGER (1..64),--indicate the legacy band 5
    schedulingInfoList                  SchedulingInfoList,
    tdd-Config                          TDD-Config                 OPTIONAL,   -- Cond TDD
    si-WindowLength                     ENUMERATED {
                                            ms1, ms2, ms5, ms10, ms15, ms20,
                                            ms40},
    systemInfoValueTag                  INTEGER (0..31),
    nonCriticalExtension                SystemInformationBlockType1-v890-IEs
                OPTIONAL
}

SystemInformationBlockType1-v890-IEs::= SEQUENCE {
    lateNonCriticalExtension            OCTET STRING               OPTIONAL,   -- Need OP
    nonCriticalExtension                SystemInformationBlockType1-v920-IEs   OPTIONAL
}

SystemInformationBlockType1-v920-IEs ::=    SEQUENCE {
    ims-EmergencySupport-r9             ENUMERATED {true}          OPTIONAL,   -- Need OR
    cellSelectionInfo-v920              CellSelectionInfo-v920     OPTIONAL,   -- Need OP
    nonCriticalExtension                SystemInformationBlockType1-v10xy-IEs  OPTIONAL
}

SystemInformationBlockType1-v10xy-IEs ::=   SEQUENCE {
    -- indicate the new harmonised band 26
    additionalFreqBandSupported-r10     INTEGER (1..64)            OPTIONAL,   -- Need OR
    nonCriticalExtension                SEQUENCE {}                OPTIONAL,   -- Need OP
}
```

*SystemInformationBlockType1 message*     Figure 11

```
SystemInformationBlockType2 ::=      SEQUENCE {
    ac-BarringInfo                   SEQUENCE {
        ac-BarringForEmergency       BOOLEAN,
        ac-BarringForMO-Signalling   AC-BarringConfig              OPTIONAL,
            Need OP
        ac-BarringForMO-Data         AC-BarringConfig              OPTIONAL  --
            Need OP
    }                                                              OPTIONAL,  -- Need OP
    radioResourceConfigCommon        RadioResourceConfigCommonSIB,
    ue-TimersAndConstants            UE-TimersAndConstants,
    freq_info                        SEQUENCE {
        -- indicate the UL-Freq for legacy band 5
        ul-CarrierFreq               ARFCN-ValueEUTRA              OPTIONAL,  --
            Need OP
        ul-Bandwidth                 ENUMERATED {n6, n15, n25, n50, n75, n100}
                                                                   OPTIONAL,  -- Need OP
        additionalSpectrumEmission   AdditionalSpectrumEmission
    },
    mbsfn-SubframeConfigList         MBSFN-SubframeConfigList      OPTIONAL,  --
        Need OR
    timeAlignmentTimerCommon         TimeAlignmentTimer,
    ...,
    lateNonCriticalExtension         OCTET STRING                  OPTIONAL,  -- Need OP
    [[ ssac-BarringForMMTEL-Voice-r9 AC-BarringConfig              OPTIONAL,  --
        Need OP
       ssac-BarringForMMTEL-Video-r9 AC-BarringConfig              OPTIONAL  --
        Need OP
    ]],
    [[ ac-BarringForCSFB-r10         AC-BarringConfig              OPTIONAL   -- Need OP
    ]],
    [[ -- indicate the UL-Freq of new harmonised band 26
       additionalUL-CarrierFreqSupported   ARFCN-ValueEUTRA        OPTIONAL
        Need OP
    ]]
}
```

*SystemInformationBlockType2 information element*

Figure 12

SIGNALING FOR LEGACY TERMINAL OPERATION IN HARMONIZED BANDS

TECHNICAL FIELD

This invention pertains to telecommunications, and particularly to methods, procedures, and apparatus to enable operation and roaming of a wireless mobile terminal supporting a harmonized band and/or a smaller band which is a sub-set of or overlaps with the harmonized band.

BACKGROUND

1.0 Background Technical Concepts

The following sections contain several concepts, which are relevant to various embodiments of the technology disclosed herein.

1.1 Harmonization of Frequency Bands

A mobile terminal operates in a frequency band. Likewise, a cell in a communication network operates (or strictly: is operated) in a frequency band. Due e.g. to different spectrum regulations and spectrum allocations in different countries, there is a large variety of frequency bands in which a cell or mobile terminal may be operated. These local or operator specific bands may partially overlap or may be adjacent in frequency. Locally assigned bands of spectrum have eventually been standardized in 3GPP in terms of frequency bands so that vendors can develop equipment and products, such as base stations and User Equipment units (UEs), which are adequate for these frequency bands. FIG. 2 shows a table of such standardized frequency bands. The standardization of a frequency band encompasses various aspects including the band numbering, raster, carrier frequency channel numbering, UE and BS radio requirements, UE and BS performance requirements, RRM requirements, etc. For example, several bands are standardized and allocated in various parts of the world in 850 MHz range for UTRA FDD and E-UTRA FDD, e.g., bands 5, 6, 18 and 19 shown in FIG. 1a.

A mobile terminal configured to operate in a first frequency band cannot function in a cell operating in a second frequency band. Therefore, a recent objective of standardization work is to develop a frequency band, which can preferably be used globally or at least in large number of countries. A global or regional frequency band leads to several advantages in terms of global roaming, reduced cost of the products due to the economy of scale, simplicity in building products/devices since the same or at least limited platforms/devices can be reused globally or regionally etc. Although, certain country-specific and even operator-specific frequency bands are probably unavoidable due to the fact that the spectrum availability for mobile services may be fragmented in different countries or even within a country. Furthermore, the regulators in each country independently allocate the frequency band in accordance with the available spectrum. Further, the spectrum below 1 GHz, which has very promising propagation characteristics, might be scarce or fragmented due to higher demand by other competing technologies.

FIG. 1b shows the legacy band 2, which is primarily used in United States of America. There has been ongoing work to extend band 2 to include yet another 5 MHz (G-block) in both uplink and downlink. Such a new "extended band 2"-band is recently standardized as band 25, which may also be seen in FIG. 1e and in the table in FIG. 2.

As previously mentioned, FIG. 1a illustrates the frequency bands 5, 6, 18 and 19, which are located around 850 MHz (815-894 MHz). As can be observed from FIG. 1a, these bands either overlap or are adjacent to one another. Further, most of them are country or even operator specific. Therefore, in 3GPP there has been an extensive effort to develop one or two harmonized frequency bands in the 850 MHz range, which could cover all or most of the bands in this frequency range.

The term 'harmonized band' stems from the fact that it is the super-set or it covers more than one smaller or individual frequency bands in the frequency range. Examples of harmonized band-candidates in the 850 MHz band, which are currently being discussed, are shown in FIG. 1c. At least "Example 1" in FIG. 3 is being currently studied in 3GPP. The harmonized bands in FIG. 1c cover all the frequency bands illustrated in FIG. 1a.

A UE capable of supporting a harmonized band should be able to operate in several of these specific or individual bands. This will lead to lower UE costs since specific hardware for an individual band in this range (850 MHz) is not required. Furthermore, all operators holding spectrum in the same frequency range would be able to easily get sufficient terminals facilitating their network operation. The terminals supporting the harmonized band must also be compliant to the regulatory requirements in the legacy bands in order to operate in these.

The harmonization of frequency bands is possible in any frequency range, which contains more than one smaller or fragment bands, such as for example in the 1900 MHz range. Another frequency range being considered for harmonization is 700 MHz, which is currently fragmented into several smaller operator specific bands.

In 3GPP RAN4, two new frequency bands, which overlap with the legacy bands and which are also the superset of some of the legacy bands, are being standardized. For example, the harmonized band 26 as shown in FIG. 1d fully overlaps with legacy bands 5, 6, 18 and 19. This means that band 26 is the superset of bands 5, 6, 18 and 19. Another example is the previously mentioned new band 25, which is the superset of the legacy band 2. The band 25 is illustrated in FIG. 1e. The relation between the legacy bands and the harmonized bands exemplified above is illustrated in FIGS. 1f and 1g.

1.2 Duplex Modes of Operation

A frequency band or an operating frequency band supports a specific duplex mode of operation. The possible duplex modes are: frequency division duplex (FDD), time division duplex (TDD) and half duplex FDD (HD-FDD). In the table in FIG. 2, the duplex mode for each frequency band is indicated in the rightmost column.

In frequency division duplex (FDD) mode of operation, which is used in UTRAN FDD and E-UTRAN FDD, the uplink and downlink transmission take place on different carrier frequency channels. Therefore, in FDD mode both uplink and downlink transmission can occur simultaneously in time.

On the other hand, in time division duplex (TDD) mode, which is used in UTRAN TDD and E-UTRAN TDD, the uplink and downlink transmission take place on the same carrier frequency channel but in different time slots or sub-frames.

Half duplex FDD (HD-FDD) that is used in GSM can be regarded as a hybrid scheme where the uplink and downlink are transmitted on different carrier frequencies and are also transmitted on different time slots. This means uplink and downlink transmission do not occur simultaneously in time.

1.3 Channel Raster

In order to simplify the frequency search or the so-called initial cell search for a UE, the center frequency of a radio channel is specified to be an integral multiple of a well defined, generally fixed number, called channel raster. This enables the UE to tune its local oscillator only at one of the raster points, assuming it to be the center frequency of the channel being searched.

The channel raster in UTRAN FDD is 200 KHz, but for certain channels and bands it is also 100 KHz. In E-UTRAN FDD and TDD channel raster for all channels (i.e. all bandwidths) is 100 KHz. The channel raster directly impacts the channel numbering, which is described below.

1.4 Channel Numbering of Frequency Bands

The carrier frequencies in a frequency band are enumerated. The enumeration is standardized such that the combination of the frequency band and the carrier frequency can be determined by a unique number called the "absolute radio frequency number".

In GSM, UTRAN and E-UTRAN the channel numbers are called as Absolute Radio Frequency Channel Number (ARFCN), UTRA Absolute Radio Frequency Channel Number (UARFCN) and E-UTRA Absolute Radio Frequency Channel Number (EARFCN), respectively.

In FDD systems, separate channel numbers are specified for UL and DL. In TDD there is only one channel number since the same frequency is used in both directions.

The channel numbers (e.g. EARFCN) for each band are unique to distinguish between different bands. The channel number for each band can be derived from the expressions and mapping tables defined in the relevant 3GPP technical specifications, e.g. TS 36.101 and TS 36.104. Based on the signaled channel numbers (e.g. EARFCN in E-UTRAN) and the pre-defined parameters associated with each band, a UE can determine the actual carrier frequency in MHz and the corresponding frequency band. This is explained by the following example.

For example, the relation between the EARFCN and the carrier frequency ($F_{DL}$) in MHz for the downlink is pre-defined by the following Equation 1.

$$F_{DL}=F_{DL\_low}+0.1(N_{DL}-N_{Offs-DL})\qquad\text{Equation 1}$$

In Equation 1, $F_{DL\_low}$ and $N_{Offs-DL}$ are pre-defined values in for each band and $N_{DL}$ is the downlink EARFCN.

Consider E-UTRA band 5, whose EARFNC range ($N_{DL}$) as pre-defined in e.g. 3GPP TS 36.101 and TS 36.104 lies between 2400-2649. The pre-defined values of $F_{DL\_low}$ and $N_{Offs-DL}$ are 869 and 2400 respectively. Assume the network signals downlink EARFCN to be 2500. Using the above expression the UE can determine that the downlink carrier frequency of the channel is 879 MHz. Furthermore, as stated above that the pre-defined EARFNC range being unique for each band, hence the UE can determine the frequency band corresponding to the signaled EARFNC. An expression to derive the E-UTRA FDD uplink carrier frequency, which is similar to that of the downlink carrier frequency, is also pre-defined. In E-UTRA FDD both fixed transmit-receive frequency separation (i.e. fixed duplex) and variable transmit-receive frequency separation (i.e. variable duplex) are supported. If fixed transmit-receive frequency separation is used by the network then the network does not have to signal the uplink EARFCN since the UE can determine the UL carrier frequency from the downlink carrier frequency and the pre-defined duplex gap. In an event the variable duplex is employed by the network for a certain band then both DL and UL EARFCN have to be signaled.

1.5 Channel Number Indication Mechanism for Mobility

For the initial cell search, or more specifically for the initial carrier frequency search, the UE has to search at all possible raster frequencies, e.g., with 100 KHz resolution in the E-UTRAN frequency band. However, for the UEs camped on or connected to the cell, the network signals the absolute radio frequency channel number(s) for performing measurements, mobility decisions such as cell reselection or commanding handover to certain cell belonging to certain frequency channel of the same or of different radio access technology (RAT), etc.

Hence the UE, after camping on a cell in idle mode or when connected to a cell in connected mode, can acquire the cell specific or UE specific system information, which contains information such as frequency band number (frequency band indicator), absolute radio frequency channel number(s) etc. More specifically in LTE the band number and the ARFCN (e.g. UL EARFNC in LTE) is signaled to the UE over the relevant system information blocks (SIB). For example in LTE the band number and the EARFCN of the cell are signaled to the UE over SIB1 and SIB2 respectively. A frequency band indicator, such as a frequency band number, may also be denoted a frequency band identifier.

The SIB1 uses a fixed schedule with a periodicity of 80 ms and repetitions made within 80 ms. The first transmission of SIB1 is scheduled in sub-frame #5 of radio frames for which the SFN mod 8=0, and repetitions are scheduled in sub-frame #5 of all other radio frames for which SFN mod 2=0. The SIB1 also contains the scheduling information of the remaining SIBs, e.g., SIB2, SIB3 etc. This means SIB2 scheduling information is determined by the UE by acquiring SIB1, which is transmitted with a periodicity of 80 ms. The contents of the SIB1 and SIB2 in LTE are also shown in FIGS. 10 and 11, respectively.

The network can request the UE to perform handover to another frequency or another RAT in the frequency band, which can either be the same or different than the carrier frequency of the serving cell. Therefore, in order to assist the UE to perform the inter-frequency or inter-RAT handover, the network signals the frequency channel number of the target carrier frequency in the handover command. For example, for the UE in the connected mode the network (the eNodeB in LTE) signals the SIB2 to the UE using the UE specific channel.

1.6 Problems with Existing Technology

There are large number of legacy/existing sub-bands ($B_s$), which fully overlap and also are sub-sets of the large new harmonized frequency bands ($B_H$), e.g., the legacy band 18 overlaps with new harmonized band 26. Similarly the legacy band 2 overlaps with the new larger band 25.

A problem is that a UE which supports a legacy band may roam or otherwise travel into a network which operates using a harmonized band. For example, a UE capable of supporting band 18 may roam into a network which operates using band 26.

A legacy UE does not recognize a new harmonized band. For example, a band 2-capable UE will not recognize a base station operating using band 25, even though band 2 is a subband of band 25 (i.e. band 25 comprises all frequencies comprised in band 2). According to another example, band 5, 6, 18 or 19-capable UEs will not recognize a base station operating using band 26, although all of the bands 5, 6, 18 and 19 are subsets (i.e. subbands) of band 26.

The consequence is that a legacy UE will not be able to operate in a new harmonized band. Hence, the legacy UE cannot access the network and will not be served by a network using the harmonized band. This means that in such scenarios the roaming of legacy devices will not be possible. This will thus result in the loss of the revenue for an operator which has deployed the network (e.g., eNode Bs) operating using the harmonized band. Hence, a solution is needed to enable legacy UE operation in the harmonized bands or in any band which is superset of its own legacy band.

SUMMARY

In one of its aspects the technology disclosed herein provides a set of rules and signaling means to ensure that a legacy UE supporting a legacy band is able to operate in a network which operates using a harmonized or larger frequency band, which is the superset of the UE legacy frequency band.

In an example embodiment and mode a method in the radio network node comprises signaling the frequency information of the harmonized frequency band and of at least one sub-band which is the subset of the harmonized band. In an example embodiment and mode, the frequency information comprises of at least frequency band number, UL and/or DL ARFCN, UL and/or DL channel bandwidth, etc. In an example embodiment and mode, the frequency information for each frequency band that is signaled to the UE and to other network nodes (e.g. BS, Node B, eNode B, RNC, BSC, donor BS etc) comprises at least frequency band number, UL and/or DL ARFCN, etc.

In an example embodiment and mode the method comprises that the radio network node supporting a certain harmonized frequency band also implement and signal the frequency information related to at least one overlapping sub-band. The method also comprises such a radio network node to receive and recognize any signals (e.g. control and/or user data etc) sent by at least one UE using one harmonized and another UE using sub-band.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 2 is a table listing different frequency bands or operating bands, as standardized in 3GPP according to the prior art.

FIG. 6 is a diagrammatic view illustrating portions of a communications network including a network node and a user equipment unit (UE) and signaling for legacy terminal operation in harmonized bands according to an example embodiment.

FIGS. 9-10 show System Information (SI) (e.g. SIB1 and SIB2) according to the prior art.

FIGS. 11-12 show Modified System Information (SI) (e.g. modified SIB1 and SIB2) to incorporate information related to the legacy and harmonized bands according to an exemplifying embodiment.

DETAILED DESCRIPTION

Figure 1A:
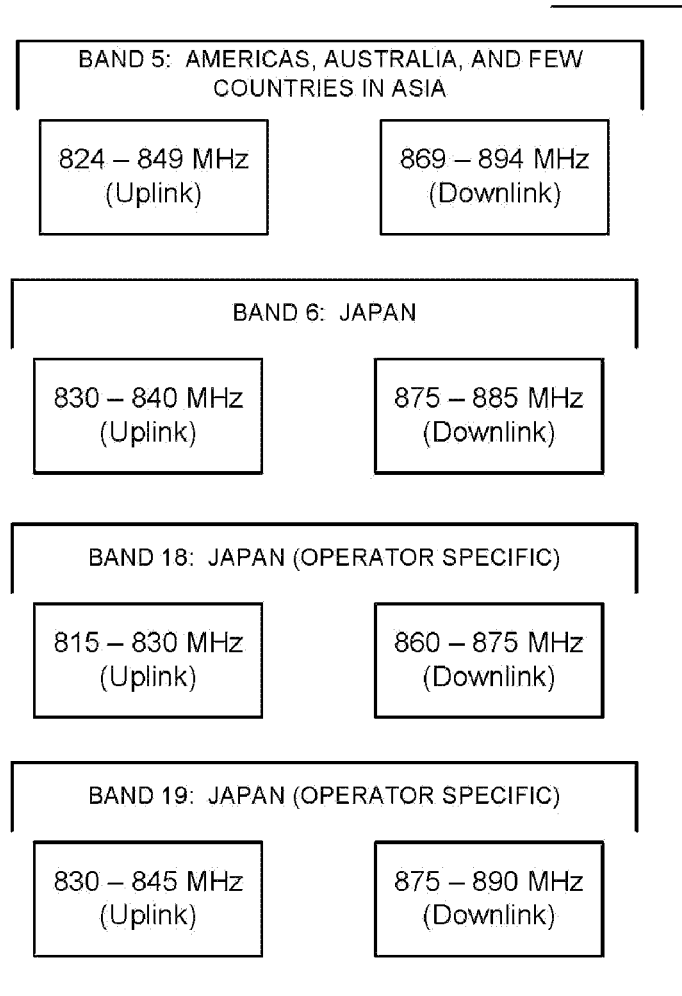
FIG. 1a is a diagrammatic view illustrating individual legacy frequency bands within 850 MHz range, according to the prior art.
Figure 1B:
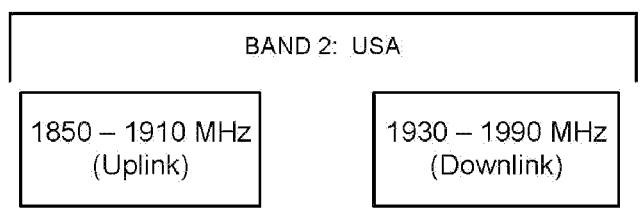
FIG. 1b is a diagrammatic view illustrating a legacy frequency band, according to the prior art.
Figure 1C:
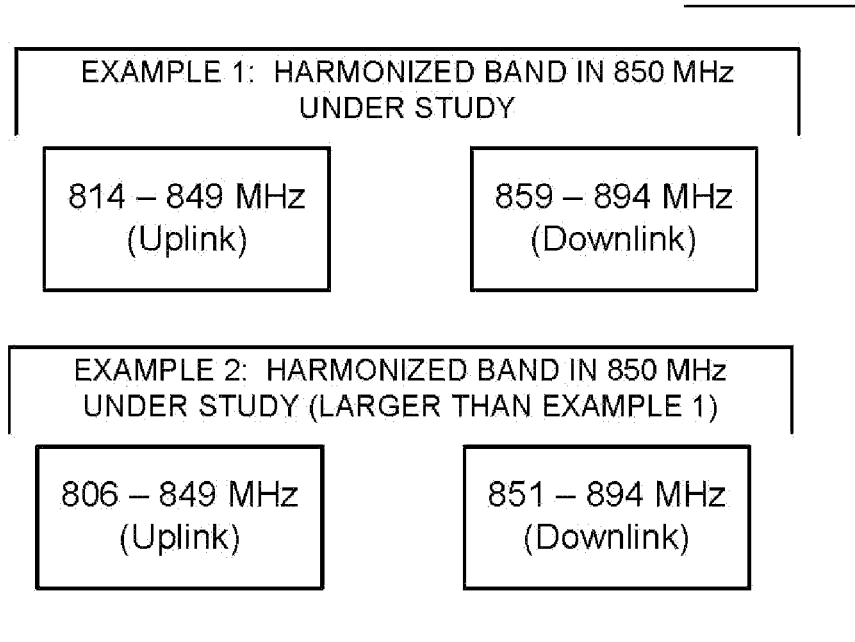
FIG. 1c is a diagrammatic view illustrating possible harmonized frequency bands within the 850 MHz range, according to the prior art.
Figure 1D:
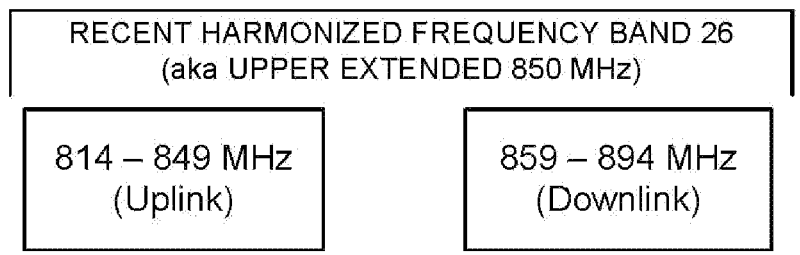
FIG. 1d is a diagrammatic view illustrating recent Harmonized frequency band 26 (aka upper extended 850 MHz), according to the prior art.
Figure 1E:
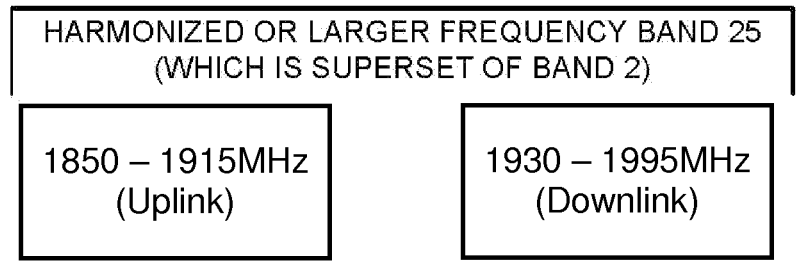
FIG. 1e is a diagrammatic view illustrating harmonized or larger frequency band 25, which is superset of band 2, according to the prior art.
Figure 1F:
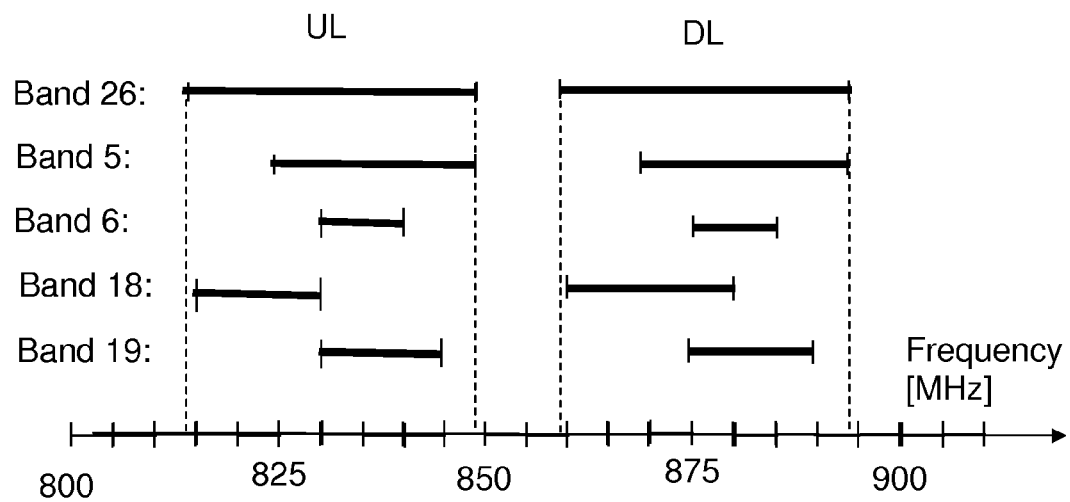
FIGS. 1f-1g are diagrammatic views illustrating the relation between legacy frequency bands and harmonized frequency bands according to the prior art.
Figure 1G:
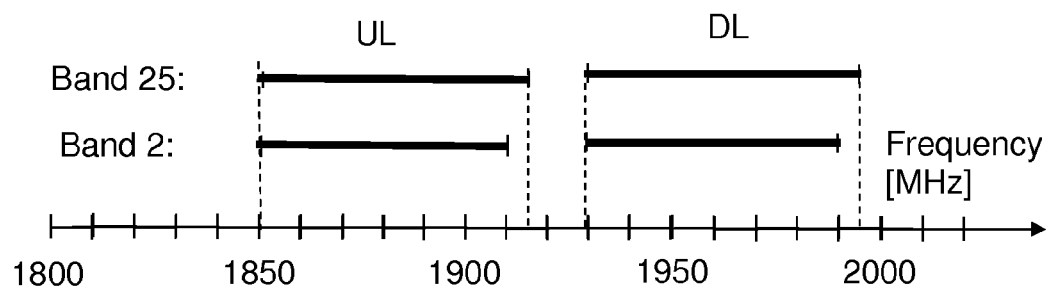

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions.

2.0 Generic Embodiments

In its various aspects the technology disclosed herein comprises both a first example embodiment (an "Additional IE embodiment" wherein an additional information element is included in the System Information) and a second example embodiment (a "signaling embodiment" wherein signaling of the modified system information (SI) is provided to other network nodes).

Regardless of the specific method used, one common aspect and general feature of the technology disclosed herein is that a first network node signals at least two sets of frequency information to a UE and to the third network nodes:

One set of the frequency information is used to indicate that the second network node X operates using frequency band A (i.e. harmonized or larger frequency band).

The second set of the frequency information is used to indicate that the same second network node X operates using legacy frequency band B1 (i.e. legacy band which is the sub-band of the harmonized or larger frequency band).

The first network node sends the above information to the UE on common channel for UE in idle or in any low activity states and on the dedicated channel for the UE in connected or active state.

The following terms have meaning herein as understood from the ensuing descriptions.

2.1 Frequency Information

The frequency information (or any relevant frequency band information) may comprise of at least one of frequency band number, uplink and/or downlink channel number, uplink and/or downlink channel bandwidths, channel raster (if necessary, e.g., if more than one is possible), duplex information (FDD, TDD, half duplex FDD (HD-FDD), number of DL and/or UL sub-frames in case of HD-FDD etc), RX-TX separation in case of variable RX-TX separation etc. Notably the most important and fundamental pieces of the frequency information are the frequency band number or indicator (e.g. band 26, band 5 etc) and the channel number (e.g. DL and/or UL EARFCN in LTE). The frequency information may also include additional contents such as random access related parameters etc to enable the UE to access the cell operating with frequency band supported by the UE.

2.2 First Network Node

The first network node is any node which signals the frequency information to the UE or to other network nodes (i.e. to the third node). The frequency information to the UE is signaled via higher layer signaling. For example the information is signaled to the UE by using RRC via common channel and via dedicated (i.e. UE specific channel) in HSPA and LTE. Examples of the first network node are base station, radio base station, Node B, eNode B, BTS, radio network controller, base station controller, positioning node, core network node, any type of network controller, relay node, donor node serving relay, donor base station, donor Node B, donor eNode B, another relay node in a multi-hop relaying system, donor radio network controller, donor base station controller, etc.

2.3 Third Network Node

The third network node is any node which receives the frequency information from the first network node. The third node may also signal the frequency information to the first node. The frequency information between the first and the third node is signaled/exchanged via suitable signaling over the interface between the first and the third nodes. For example, in LTE the information is signaled by the serving eNode B (first node) to the target eNode B (third node) over the X2 interface between eNode Bs. Similarly in HSPA the information can be signaled between the RNC (first node) and another RNC (third node) over Iur interface or between RNC and Node B (third node) over Iub interface. Examples of the third node are base station, radio base station, Node B, eNode B, BTS, radio network controller, base station controller, positioning node, core network node, any type of network controller, relay node, donor node serving relay, donor base station, donor Node B, donor eNode B, another relay node in a multi-hop relaying system, donor radio network controller, donor base station controller etc.

2.4 Second Network Node

The second network node is the radio network node whose supported frequency information is provided to the UE by the first node. In some cases the first and second nodes may be the same. For example in LTE the eNode B is the first node and also the second node. In HSPA the second node is the Node B. A general term for the second node is a radio base station or an access point. Examples of the second network node are base station, radio base station, Node B, eNode B, BTS, donor node, donor base station, donor Node B, donor eNode B, donor Node, another relay node in a multi-hop relaying system, etc.

2.5 User Equipment Unit (UE)

A "UE" (user equipment unit (UE)) encompasses mobile stations or wireless terminals such as mobile telephones ("cellular" telephones), laptops and tablets with wireless capability, e.g., mobile termination, and thus can be, for example, portable, pocket, hand-held, computer-included, or car-mounted mobile devices which communicate voice and/or data with radio access network. In some example embodiments a wireless terminal need not be mobile but can instead be fixed.

In case of relay the method can be independently applied to each link of the relay, i.e. access link and backhaul link or any link between relays in multi-hop relays.

The embodiments of the technology disclosed herein are applicable to any type of technology including LTE, HSPA, GSM, EDGE, CDMA2000, HRPD etc. The technology disclosed herein is also applicable to network node which supports multi-standard radio (MSR), which may comprise of any combination of RATs and carriers. The technology disclosed herein is also applicable to carrier aggregation or more commonly known as the multi-carrier systems, such as e.g. intra-RAT multi-carrier, inter-RAT multi-carrier system etc.

3.0 Additional Information Element in System Information

According to this embodiment, one or more additional new information elements (IEs) or relevant object containing the frequency information can be appended to the existing system information (SI) which is signaled to the UE by the first network node. The SI is signaled to the UE on broadcast channel and on dedicated channel to the UEs in idle state (or low activity states, e.g., CELL_PCH, URA_PCH, CELL_FACH etc in UTRAN or any micro sleep mode in any other system) and connected state (aka active mode) respectively. For example the new IE(s) can be included in one or more of the system information blocks (SIBs). The new IEs may contain the frequency information of the new harmonized band (e.g. frequency band indicator identifying the frequency band, UL and/or DL carrier frequency and UL and/or DL bandwidth etc as described above in section 3.1) and is thus recognized by the new UE (e.g. UE supporting band 26). The existing IEs may contain the frequency information of the legacy sub-band (e.g. band 5 which is sub-band of band 26). The new IEs may be signaled in extensions to the conventional signaling, which extensions may be discarded or ignored by legacy equipment.

This means according to the technology disclosed herein the modified system information will contain at least two sets of information pertaining to the frequency bands (1) a first set of frequency information corresponding to the frequency band A, which is recognized by the new UE (e.g. band 26 capable UE); and (2) a second set of frequency information corresponding to the frequency band B, which is recognized by at least the legacy UE (e.g. legacy band 5 capable UE).

It is assumed that band B is standardized prior to band A. Hence band A capable UEs exist before band B capable UEs. The above modified system information incorporating multi-band information will become apparent with an example below.

The UE uses prior art methods to perform the cell search to identify a cell (e.g. PCI of a cell) and acquire the system information. The acquired SI enables the UE to determine whether the identified cell operates on the frequency band (e.g. by reading the signaled band indicator, channel number of the operating carrier frequency etc), which is supported by the UE or not. This means the UE shall read the above modified SI (e.g. relevant SIBs) of the identified cell and determine whether the cell supports/operates over its supported frequency band.

3.1 Methods for Deciding when to Signal Modified SI Containing Additional IEs

The network (e.g. second network node) can decide when it is necessary to signal the modified SI (e.g. containing two sets of IEs containing the frequency information: one for legacy band and one for new band) or when it is sufficient to signal the existing/old SI (i.e. containing one set IEs containing the frequency information). The determination can be based on number of criteria listed below.

3.1.1 Based on Historical Information

For example in the beginning the network can signal the modified SI and observes if there are sufficient number of legacy UEs or new UEs accessing the network. If it is observed that both legacy and new UEs exist (e.g. above certain number over certain time) then the network can continue signaling the modified SI. Otherwise the network can signal the existing SI to the UE in the network. The existing SI will then contain the frequency information pertaining to the frequency band for which there exists sufficient number of UEs. For example if it observed that mainly there UEs supporting band 26 then the SI will contain information related to this band i.e. band 26. On the other hand if it observed that there are mainly UEs supporting only legacy band 5 then the SI will contain information related to this band, i.e., band 5.

3.1.2 Based on Overlapping Part of the Frequency

An operator owns only part of the frequency band, e.g., 10 MHz out of the entire band. In the modified SI, the network can therefore signal the legacy band which at least partially overlaps with the part of the harmonized band, which is owned by the operator. Consider that an operator owns and operates its network within (UL=814-824 MHz and DL=859-869 MHz) of the harmonized band 26. This particular network can therefore support operation only within UL=814-824 MHz and DL=859-869 MHz. Hence the network can therefore select band 18 (UL=815-830 MHz and DL=869-875 MHz) information to be signaled in the legacy IEs of the modified SI. In the new IEs of the modified SI, the network can signal the frequency information for band 26.

3.1.3 Based on UE Capability Information from Multi-Band UEs

An operator may operate its network over multiple frequency bands, e.g., band 2, band 26 and band 4. The statistics of the UE supporting particular band in the network can also be obtained by the received UE capability information from the UE which supports multi-bands, e.g., UE supporting band 2 and band 5. For example a multi-band UE may report its capability corresponding to all supported bands to the network (e.g. first network node) at the time of call setup or whenever requested by the network. This will enable the network to determine if there are UEs supporting certain legacy sub-bands which are part of the harmonized band. Consider that the UE supporting bands 2 and 5 reports its band 5 capability to the network when operating under band 2. Assume also that presently the same network may also be operating using band 26 (i.e. signaling the legacy SI). Then based on the received capability information the network may start signaling the modified SI, e.g., containing frequency information for band 5 and band 26.

3.2 Specific Example of Modified System Information with Multi-Band Information

In order to illustrate the modified SI, which contains the additional IE containing the frequency information of the harmonized/new band is illustrated with an example for LTE. For example the signaling may introduce the additional information in SIB1 and SIB2 as shown FIGS. 11 and 12. The person skilled in the art can understand that similar modification can be applied to the system information signaled to the UE in other technologies, e.g., UTRAN, GSM, CDMA2000, etc. FIGS. 11 and 12 thus show Modified System Information (SI) (e.g. modified SIB1 and SIB2) to incorporate information related to the legacy and harmonized bands in LTE.

4.0 Signaling of the Modified System Information (SI) to Other Network Nodes

According to this embodiment the modified SI can also be signaled or exchanged between the network nodes, e.g., between the second network nodes such as between eNBs in LTE or between first and the second network nodes and also between the second and the third network nodes, etc. For example, the signaling can be used for performing a handover or for planning the network. For instance the statistics about the UE operating using legacy and harmonized bands in the network can be exchanged between the nodes to determine whether the signaling of the legacy SI is enough or if modified SI should be used instead.

5.0 Exemplifying Procedure

Figure 3:
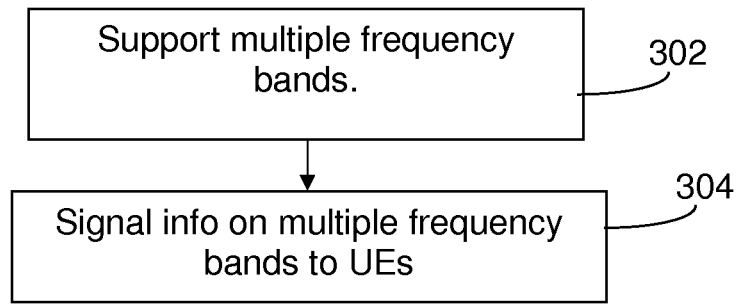
FIGS. 3-4c are flow charts illustrating actions in procedures in a network node according to different exemplifying embodiments.

FIG. 3 shows an exemplifying procedure or method in a network node in a cellular communication system. The network node is associated with a cell in the communication system. The method is suitable for supporting use of different types of UEs in said cell. By different types is here meant UEs configured to operate in different respective frequency bands, such as e.g. a UE configured to operate in a legacy frequency band (e.g. band 2) and a UE configured to operate in a new, wider, harmonized frequency band (e.g. band 25), which is a super-set of the legacy frequency band or at least partly overlaps the legacy frequency band.

At least part of, at least two frequency bands is supported in one or more actions 302. The frequency bands are assumed to have a respective predefined frequency band indicator, c.f. the frequency band numbers listed in the table in FIG. 2. Supporting (communication) may refer to different features depending on e.g. in which type of node the procedure is performed. The network node may be either the "first node" or the "second node" previously described in the description. For example, when the network node is an eNB in an LTE system or an RNC in a WCDMA/HSPA system, supporting may refer to generating information related to the at least two frequency bands; determining a relation between the different frequency bands, and/or mapping of one frequency band into another frequency band. When the network node is e.g. a NodeB in a WCDMA/HSPA system, supporting (communication) may refer to signaling the information related to the at least two frequency bands to RNC. When the network node is e.g. an RNC in a WCDMA/HSPA system, supporting (communication) may refer to signaling the information related to the at least two frequency bands in a Node B to another RNC.

Further, information associated with the at least two frequency bands is signaled, in an action 304, to UEs in the cell. The information may comprise one or more of: frequency band number identifying the frequency band; uplink absolute channel number; downlink absolute channel number; uplink channel bandwidth; downlink channel bandwidth; channel raster; duplex information; indication that variable RX-TX frequency separation is supported; RX-TX frequency separation; random access related parameters and additional spectrum emission requirement. In a preferred embodiment, there is at least a first frequency band and a second frequency band amongst the respective different frequency bands, where the second frequency band at least partly overlaps with the first frequency band. One supported frequency band may be the superset of one or more other frequency bands, such as e.g. one or more other supported frequency bands. A frequency band may be supported in part.

Thus, the use of different UEs with different capabilities, operating in a respective different one of said at least two frequency bands, is enabled. For example, if the cell is operated in the new, wider, harmonized band 25, it may signal a frequency band indicator for band 25 in addition to signaling a frequency band indicator for legacy band 2. Then, both UEs capable of frequency band 25 and UEs capable of frequency band 2 will, when receiving their respective frequency band indicator, recognize the cell as operating in their frequency band. This could be regarded as that it is simulated that the cell is operated in frequency band 2, when band-2-UEs are in fact served in a part of frequency band 25.

Analogously, if the cell is operated e.g. in legacy frequency band 2, the network node signals a frequency band indicator for band 2 and in addition e.g. a frequency band indicator for new, wider, harmonized band 25. In this case, only a part of band 25 is supported in the cell, namely the frequencies which are also comprised in legacy band 2 (and which are allowed or accessible for the operator of the cell). However, to a band-25-UE, the cell appears to be operated in frequency band 25, since a frequency band indicator for band 25 is received by the UE in the cell.

Figure 4A:
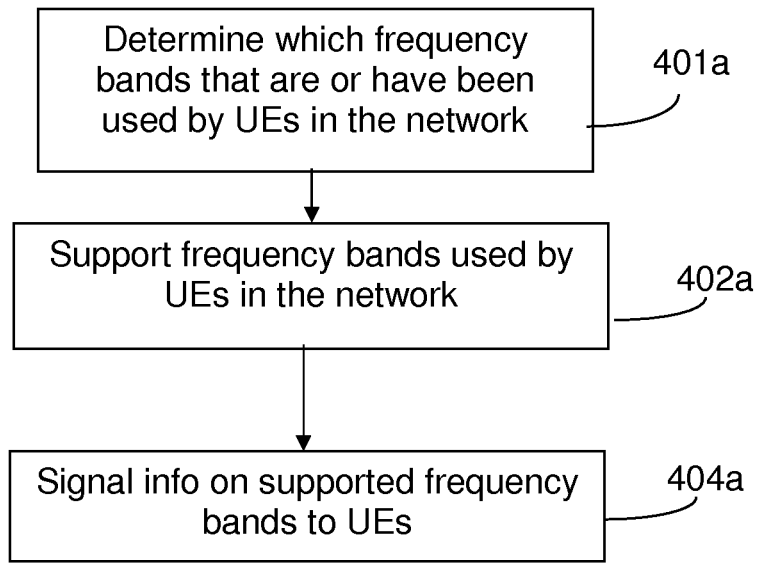
Figure 4B:
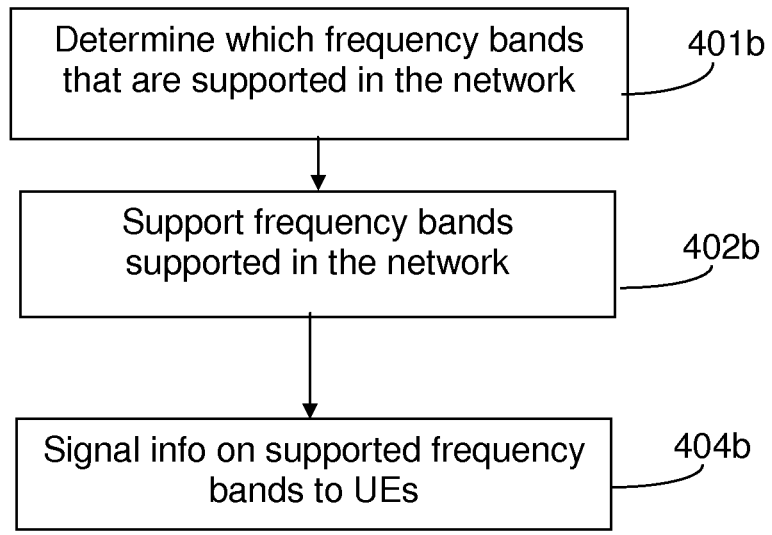
Figure 4C:
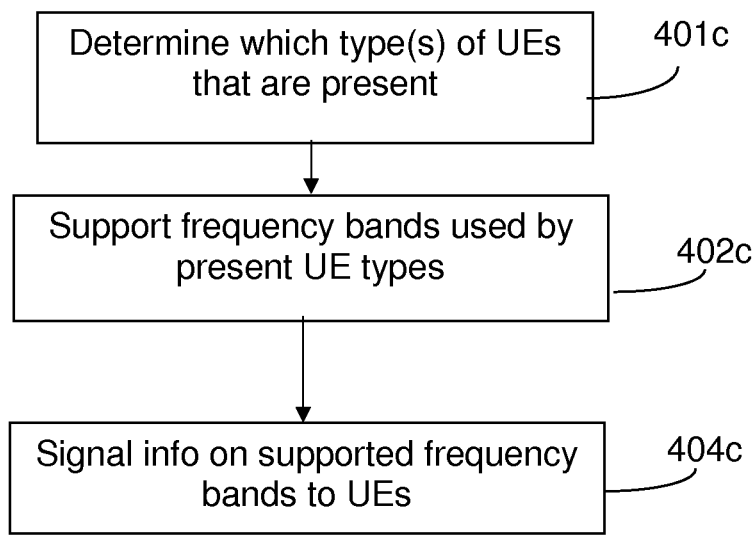

FIGS. 4a-c illustrate different procedures in a network node as the one described in conjunction with FIG. 3 above. The procedures illustrated in FIGS. 4a-c show different alternatives for selecting which frequency bands to support and signal to UEs in the cell. The different alternatives illustrated in these figures have also been previously described herein. In FIG. 4a, the procedure comprises determining 401a which frequency bands that are or have been used by UEs in the network or part thereof, e.g. within a certain period of time. This may be determined based on historical data, e.g. accumulated in a node in the network, such as an O&M configuration node, and provided to the network node. When it has been determined which frequency bands that have been used, and possibly determined which of the frequency bands that should be supported based on some criterion, the network node performs the action(s) 402a necessary in order to support these frequency bands. Information on the supported frequency bands is then signaled to UEs in the cell in an action 404. In a preferred embodiment, only frequency bands which have some frequencies in common with the frequency band in which the cell in question is operated will be supported.

In the procedure illustrated in FIG. 4b, it is determined in an action 401b, which frequency bands that are supported in the network or in a part of the network. The determining of the frequency bands may be performed based on information received from one or more nodes in the network. For example, it could be determined that all frequency bands supported in the rest of the network should be supported in the cell in question. Alternatively, it may be determined that only the frequency bands supported in a certain area, e.g. in the vicinity of the cell in question, should be supported in the cell in question.

In the procedure illustrated in FIG. 4c, it is determined in an action 401c which type(s) of UEs that are present, i.e. the frequency band capabilities of the UEs in the cell and/or in the network. Information on UE-capabilities may be received directly from UEs or from another network node which has obtained such information. The frequency bands of which the UEs are capable, or a sub-set thereof, are then to be supported in the cell. The UEs may have multi-band capabilities.

The procedures illustrated in FIGS. 4a-c could be used in combination and/or together with different decision criteria, such as that frequency bands supported or used by a certain number of nodes and/or UEs should be supported. Further, the procedures may be combined with rules stating that certain frequency bands, or parts thereof, should or should not be supported.

The information associated with the frequency bands supported in the cell may be signaled to a UE in different ways, e.g. depending on in which state the UE is. For UEs in e.g. LTE idle mode or any of the UMTS low activity states, the information may be signaled over a broadcast channel, e.g. in one or more SIBs. For UEs which are in a connected or active state, the information may be signaled over a UE specific channel, e.g. in one or more SIBs. The information may further be signaled to one or more other network nodes in the network, in order e.g. for the other network nodes to use the signaled information for tasks such as handover, network planning or the like.

6.0 Implementation Examples

Figure 5:
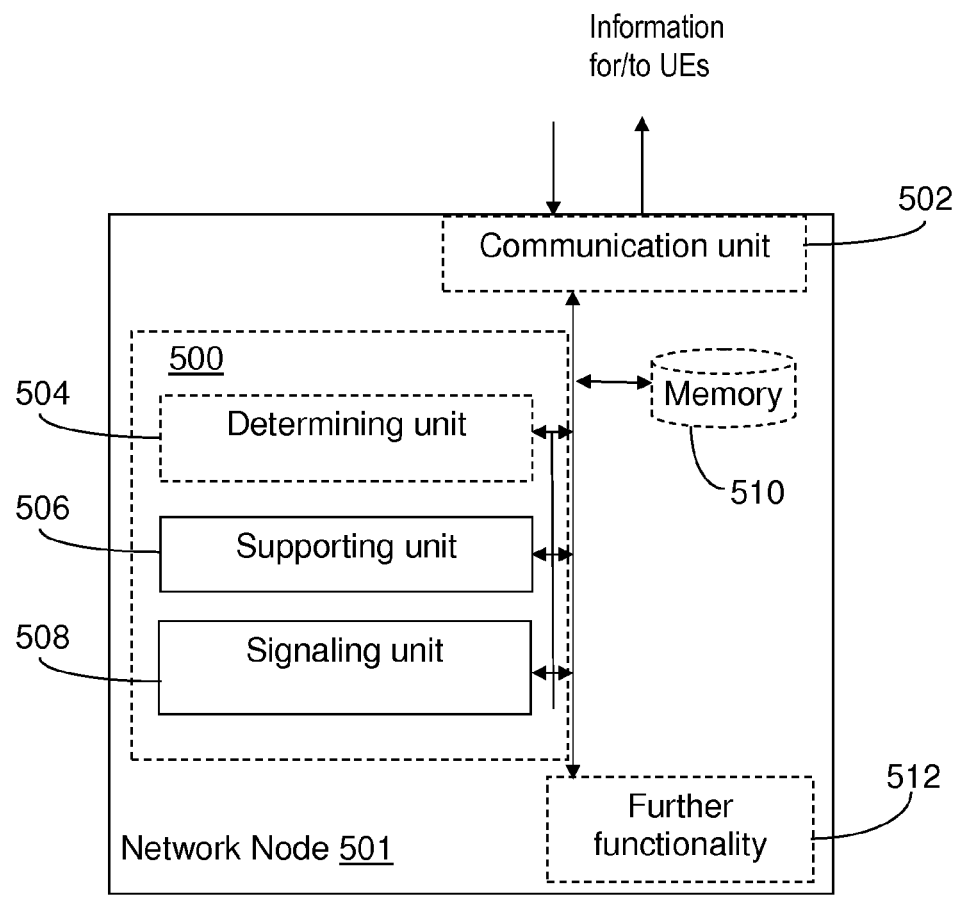
FIG. 5 is a block diagram illustrating a network node according to an exemplifying embodiment.

FIG. 5 shows a network node 501, operable to be associated with a cell in a cellular communication system. The network node may be a node corresponding to the first, second (or third) node as previously described herein. The network node is suitable for enabling use, in said cell, of different types of mobile terminals. The network node 501 may be assumed to comprise a communication unit 502, comprising transceiver equipment adapted for communicating with other nodes and UEs. The network node 501 may further comprise one or more memory units 510 and further functionality 512, for providing e.g. regular functionality.

The network node 501 comprises processing circuitry configured to perform the actions described above in conjunction with FIGS. 3 and 4. The processing circuitry may be implemented by or comprise hardware and/or software components as previously described. The processing circuitry may be implemented and/or illustrated as a number of functional units, which is the case in FIG. 5. The network node may comprise a determining unit (504), adapted to determine which at least two frequency bands to support based on one or more criteria. The one or more criteria may be historical data or statistics related to frequency bands used by UEs in at least part of the network; information on frequency bands supported in at least part of the network and/or information on frequency band capability of UEs in at least part of the network.

The network node 501 comprises a supporting unit 506, adapted to support, at least part of, at least two frequency bands having a predefined frequency band indicator in said cell. The network node further comprises a signaling unit 508, adapted to signal information associated with said at least two frequency bands to UEs in the cell. Thus, use of UEs operating in a respective different one of said at least two frequency bands in the cell is enabled.

There may be at least a first frequency band and a second frequency band amongst the respective different frequency bands, where the second frequency band at least partly overlaps the first frequency band. In a preferred embodiment, one of the respective frequency bands is a legacy frequency band, used by legacy equipment, and one of the respective frequency bands is a harmonized band, at least partly overlapping the legacy frequency band. The information associated with the respective frequency bands may comprise one or more of: frequency band number; uplink absolute radio frequency channel number; downlink absolute radio frequency channel number; uplink channel bandwidth; downlink channel bandwidth; channel raster; duplex information; indication that variable RX-TX frequency separation is supported; RX-TX frequency separation; random access related parameters; and additional spectrum emission requirement.

As previously mentioned, at least one of the respective frequency bands may be a superset of one or more other frequency bands, e.g. a so-called harmonized band. Further, a first frequency band of the respective frequency bands may be a sub-band of a second frequency band of the respective frequency bands. At least one of the respective frequency bands may be associated with legacy equipment. At least one of the respective frequency bands may not be associated with legacy equipment, but instead with, e.g. a new harmonized band.

The cell may be operating, or strictly, be operated by a/the network node, in one frequency band, FO, be further configured to support also at least part of another one, FA, of the respective frequency bands, which at least part consists of frequencies which are also comprised in the frequency band FO in which the cell is operating/being operated.

The signaling unit may be further adapted to signal the information associated with the at least two frequency bands to a UE in one or more system information blocks (SIBs) over a broadcast channel, e.g. to a UE in idle mode when the RAT is LTE; or, for example, to a UE in one of the low activity states: idle mode, URA_PCH state, CELL_PCH state or CELL_FACH state, when the RAT is UMTS.

The signaling unit may further be adapted to signal the information associated with the at least two frequency bands to a UE in one or more system information blocks (SIBs) over a UE specific channel, e.g. when the UE is in connected or active state. The signaling unit may further be adapted to signal the information associated with the at least two frequency bands to at least one other network node. For example, the other network node could be a "third network node", when the network node is a "first" and/or "second" network node. The other network node could further be a "second" network node when the network node is a "first network node". The network node and/or the other network node may be any of base station, Node B, eNode B, BTS, radio network controller, base station controller, positioning node, core network node, any type of network controller, relay node, donor node serving relay, donor base station, donor Node B, donor eNode B, another relay node in a multi-hop relaying system, donor radio network controller, donor base station controller.

FIG. 6a illustrates portions of a communication system in which example embodiments and modes of the technology disclosed herein may be implemented. FIGS. 6a and 6b show a network node 601 (first network node) which signals the two sets of frequency information to a user equipment unit (UE) 611, for example: (i) one set of the frequency information which indicates that the second network node 602 operates using frequency band A (i.e., harmonized or larger frequency band), and (ii) a second set of the frequency information which indicates that the same second network node 602 operates using legacy frequency band B1 (i.e., legacy band which is the sub-band of the harmonized or larger frequency band). FIG. 6a illustrates the first and second network node as two separate nodes, which may be the case e.g. in UMTS type systems (cf. RNC and Node B). However, as previously mentioned, the first and second network node may be one and the same, such as e.g. for an eNB in an LTE-type system. FIG. 6a further shows a legacy user equipment unit (UE) 609, assumed to operate in legacy frequency band B1.

FIG. 6b shows that the first network node 601 comprises a signal generator/signal processor (or handler) 606 which generates the appropriate messages or signals for communicating the two sets of frequency information to the user equipment unit (UE) 611, and a communications interface 608 through which the two sets of frequency information are communicated. FIG. 6b further shows that the user equipment unit (UE) 611 comprises a signal processor (or handler) 616 (which utilizes the frequency information as provided by the first network node) and a communications interface 618 (through which the frequency information is received from the first network node, e.g. via a second network node 602, over a radio or air interface).

Figure 7A:
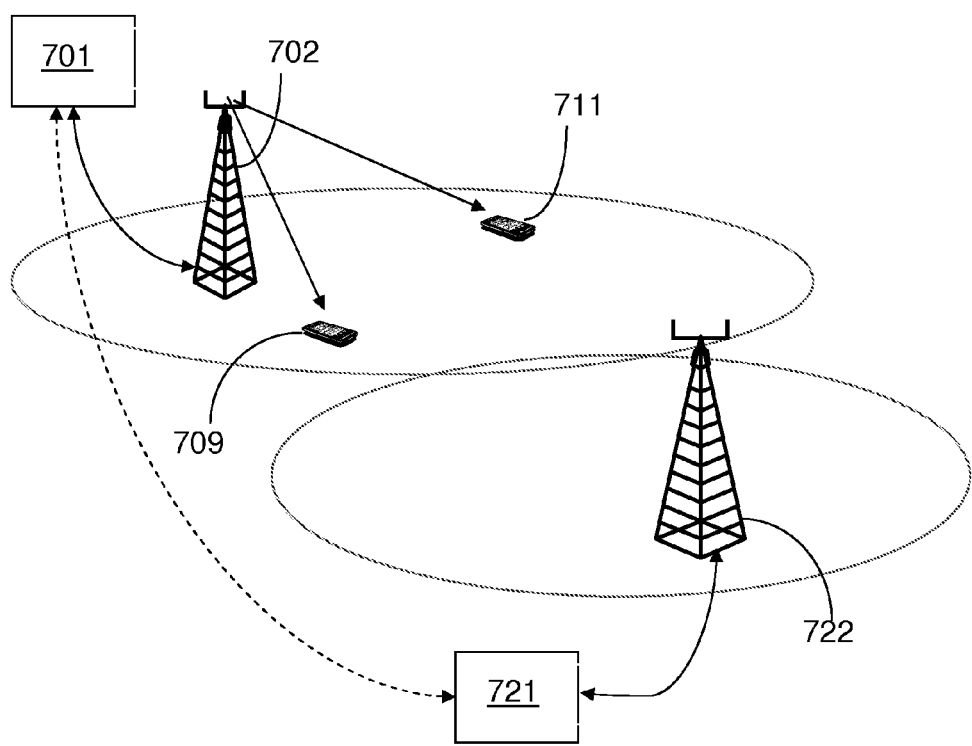
FIG. 7 is a diagrammatic view illustrating portions of a communications network including a network node and a user equipment unit (UE) and signaling for legacy terminal operation in harmonized bands according to another example embodiment.

FIG. 7a illustrates another example embodiment in which the two sets of frequency information are additionally communicated to a third network node 721, as explained above. The third network node 721 is in FIG. 7b illustrated as comprising processing circuitry 724 configured to receive the information and to use it for handover decisions or in network planning.

Figure 8:
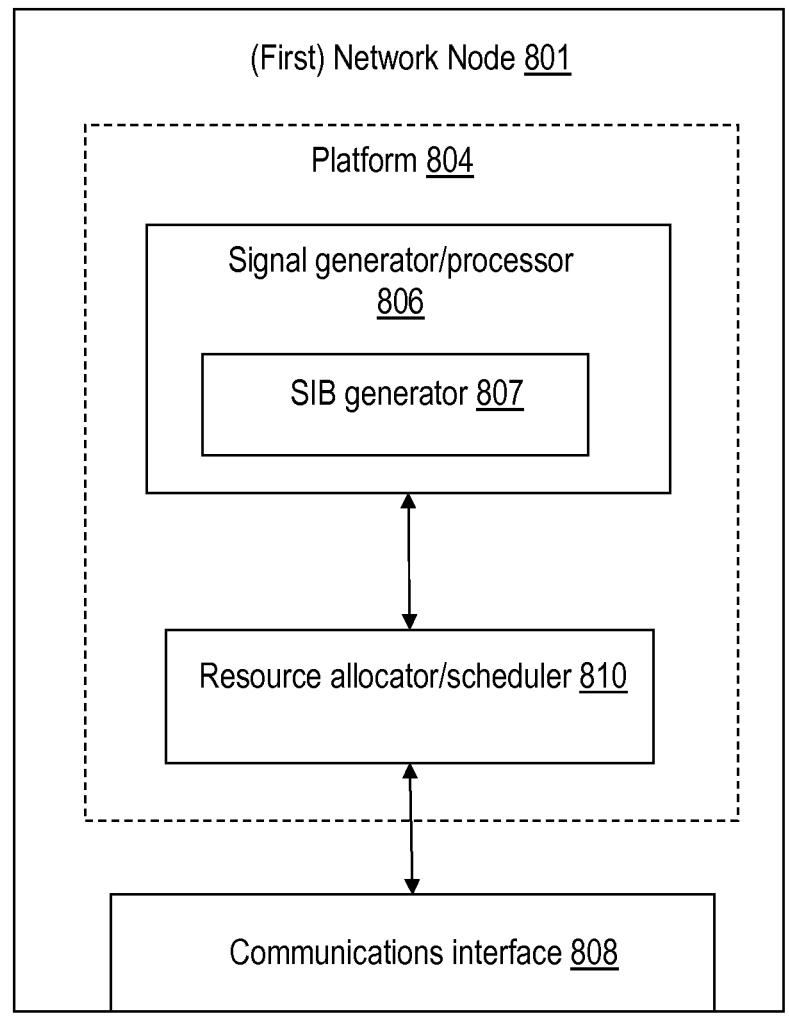
FIG. 8 is a diagrammatic view illustrating portions of an example network node suitable for use in a communications network which provides signaling for legacy terminal operation in harmonized bands.

FIG. 8 shows further details of an example, non-limiting embodiment of the first network node 801, or a combined first and second node 801, and particularly shows that the network node 801 may, in the example embodiment, further comprise a resource allocator and/or scheduler 810 which, e.g., monitors or controls use of the frequencies. The resource allocator and/or scheduler 810 is assumed to have knowledge and/or control of both of the harmonized band and of the legacy band. The example FIG. 8 embodiment further shows that the signal generator/handler comprises a system information block (SIB) generator 807 which may generate the SIB information elements described herein.

Figure 7B:
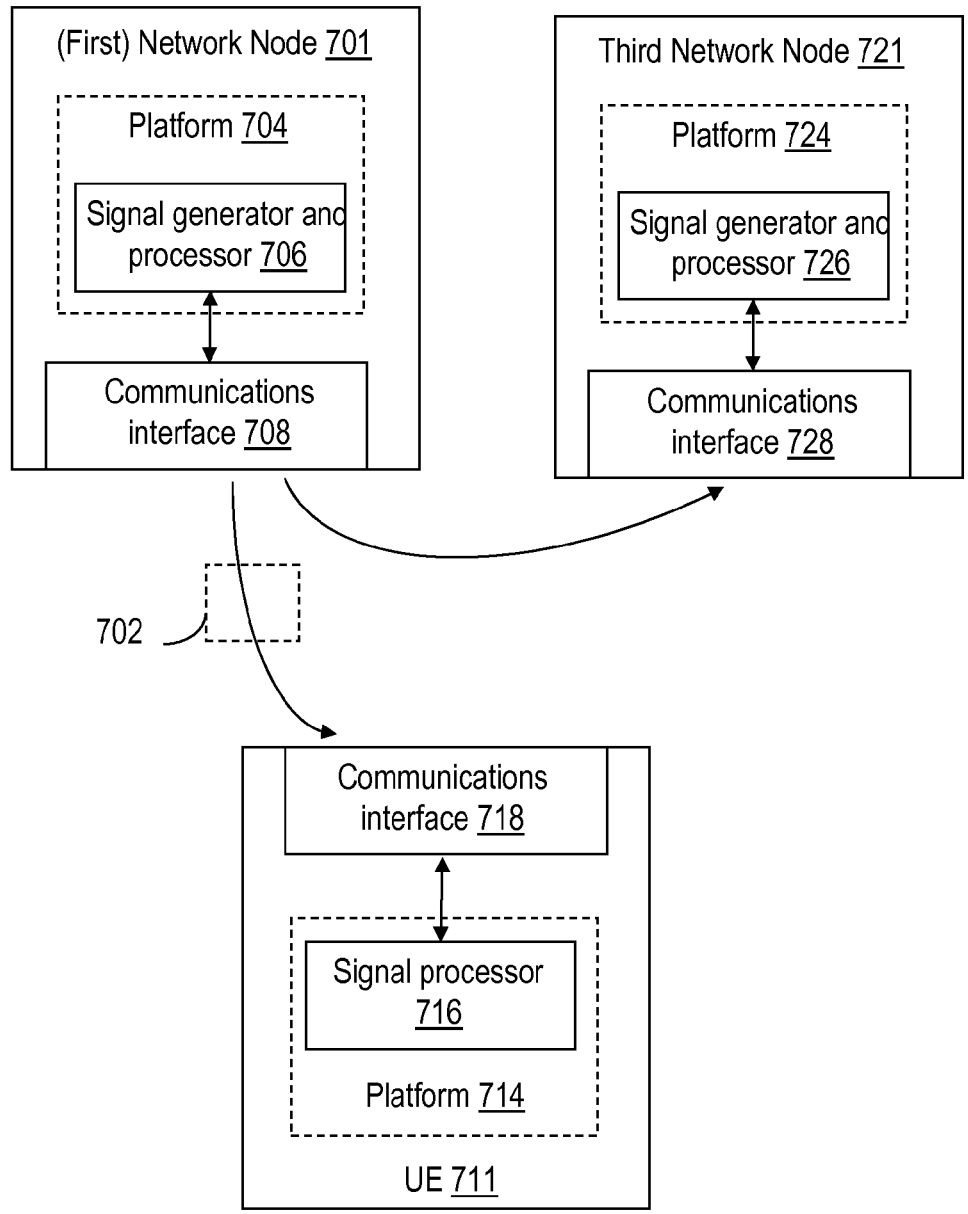

The example embodiments of FIG. 6b, FIG. 7b, and FIG. 8 also illustrated by use of broken lines that fact that various functional units of the entities shown therein may be realized or provided on a platform. The terminology "platform" is a way of describing how the functional units of a base station node can be implemented or realized by machine and/or by electronic circuitry. One example platform is a computer implementation wherein one or more of the framed elements are realized by one or more processors which execute coded instructions and use non-transitory signals in order to perform the various acts described herein. In such a computer implementation the entities may further comprise, in addition to a processor(s), a memory section (which in turn may comprise random access memory; read only memory; application memory (which stores, e.g., coded instructions which can be executed by the processor to perform acts described herein); and any other memory such as cache memory, for example). Typically the platform also comprises other input/output units or functionalities not specifically illustrated, such as a keypad; an audio input device (e.g. microphone); a visual input device (e.g., camera); a visual output device; and an audio output device (e.g., speaker). Other types of input/output devices can also be connected to or comprise the base station node.

Another example platform is that of a hardware circuit, e.g., an application specific integrated circuit (ASIC) wherein circuit elements are structured and operated to perform the various acts described herein.

7.0 Example Features

One example, non-limiting feature of the technology disclosed herein concerns a method in a network node of supporting a harmonized band and also the numbering scheme of one or more individual legacy bands, which is sub-set of or overlaps with the harmonized band.

One example, non-limiting feature of the technology disclosed herein concerns a method in a UE supporting a harmonized band and which is capable of receiving system information containing frequency information of the harmonized and at least one legacy sub-band.

8.0 Example Advantages

One example, non-limiting advantage of the technology disclosed herein is that a UE supporting a legacy band can operate in a network operating in a harmonized band, which is larger and overlaps with the legacy sub-band.

Another example, non-limiting advantage of the technology disclosed herein is that the UE supporting legacy band can roam to new larger/harmonized band, which is the superset of the legacy band.

Another example, non-limiting advantage of the technology disclosed herein is that the UE supporting a larger/harmonized band can roam to a legacy band, which is a sub-set of the larger/harmonized band.

Another example, non-limiting advantage of the technology disclosed herein is that the network node is not required to operate using harmonized band (i.e. new band) to meet all radio requirements corresponding to the legacy band(s).

Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

ABBREVIATIONS

3GPP 3$^{rd}$ Generation Partnership Project
eNodeB evolved Node B
ARFCN Absolute radio frequency channel number
EARFCN E-UTRA Absolute Radio Frequency Channel Number
E-UTRAN: Evolution UMTS Terrestrial Radio Access Network
GSM: Global system for mobile communication
LTE: Long term evolution
RAT: Radio access technology
UARFCN UTRA Absolute Radio Frequency Channel Number
WCDMA: Wide band code division multiple access
RRC Radio Resource Control
UE User Equipment
UMTS Universal Mobile Telecommunications System

The invention claimed is:

1. A method in a network node associated with a cell in a cellular communication system for enabling use, in said cell, of different types of mobile terminals (UEs), said method comprising:
   supporting at least part of each of at least two frequency bands having a respective predefined frequency band indicator in said cell, each of the at least two frequency bands supporting multiple channels or carriers at different frequencies; and
   signaling information associated with said at least two frequency bands to UEs in the cell,
   thus enabling use of UEs operating in a respective different one of said at least two frequency bands in the cell;
   wherein the method further comprises determining which at least two frequency bands to support based on information on frequency bands supported in at least part of the network.

2. The method of claim 1, wherein there is at least a first frequency band and a second frequency band among the at least two frequency bands, where the second frequency band at least partly overlaps the first frequency band.

3. The method of claim 1, wherein the information associated with the at least two frequency bands comprises one or more of:
   frequency band number;
   uplink absolute radio frequency channel number;
   downlink absolute radio frequency channel number;
   uplink channel bandwidth;
   downlink channel bandwidth;
   channel raster;
   duplex information;
   indication that variable RX-TX frequency separation is supported;
   RX-TX frequency separation;
   random access related parameters;
   additional spectrum emission requirement.

4. The method of claim 1, wherein at least one of the respective frequency bands is a superset of one or more other frequency bands.

5. The method of claim 1, wherein a first frequency band of the respective frequency bands is a sub-band of a second frequency band of the respective frequency bands.

6. The method of claim 1, wherein determining which at least two frequency bands to support is further based on historical data or statistics related to frequency bands used by UEs in at least part of the network.

7. The method of claim 1, wherein at least one of the respective frequency bands is associated with legacy equipment.

8. The method of claim 1, wherein at least one of the respective frequency bands is not associated with legacy equipment.

9. The method of claim 1, wherein the cell is operated in one frequency band, FO, and further configured to support also at least part of another one, FA, of the respective frequency bands, wherein at least part of frequency band FA consists of frequencies which are also comprised in the frequency band FO in which the cell is operated.

10. The method of claim 1, wherein the information associated with the at least two frequency bands is signaled to a UE in one or more system information blocks (SIBs) over a broadcast channel.

11. The method of claim 10, wherein the Radio Access technology (RAT) is Long Term Evolution (LTE) and the UE is in idle mode.

12. The method of claim 10, wherein the RAT is Universal Mobile Telecommunications System (UMTS) and the UE is in one of the possible low activity states:
idle mode, URA_PCH state, CELL_PCH state or CELL_FACH state.

13. The method of claim 1, wherein the information associated with the at least two frequency bands is signaled to a UE in one or more system information blocks (SIBs) over a UE specific channel.

14. The method of claim 13, wherein the UE is in connected or active state.

15. The method of claim 1, wherein the network node is any of: eNode B, base station, Node B, BTS, radio network controller, base station controller, positioning node, core network node, any type of network controller, relay node, donor node serving relay, donor base station, donor Node B, donor eNode B, another relay node in a multi-hop relaying system, donor radio network controller and donor base station controller.

16. The method of claim 1, further comprising:
signaling the information associated with the at least two frequency bands to at least one other network node.

17. The method of claim 16, wherein the at least one other network node is any of: base station, Node B, eNode B, BTS, radio network controller, base station controller, positioning node, core network node, any type of network controller, relay node, donor node serving relay, donor base station, donor Node B, donor eNode B, another relay node in a multi-hop relaying system, donor radio network controller, and donor base station controller.

18. A network node operable to be associated with a cell in a cellular communication system for enabling use, in said cell, of different types of mobile terminals (UEs), said network node comprising processing circuitry, configured to:
support at least part of each of at least two frequency bands having a predefined frequency band indicator in said cell, each of the at least two frequency bands supporting multiple channels or carriers at different frequencies; and
signal information associated with said at least two frequency bands to UEs in the cell,
thus enabling use of UEs operating in a respective different one of said at least two frequency bands in the cell;
wherein the processing circuitry is further configured to determine which at least two frequency bands to support based on information on frequency bands supported in at least part of the network.

19. The network node of claim 18, wherein there is at least a first frequency band and a second frequency band among the respective different frequency bands, where the second frequency band at least partly overlaps the first frequency band.

20. The network node of claim 18, wherein the information associated with the respective frequency bands comprises one or more of:
frequency band number;
uplink absolute radio frequency channel number;
downlink absolute radio frequency channel number;
uplink channel bandwidth;
downlink channel bandwidth;
channel raster;
duplex information;
indication that variable RX-TX frequency separation is supported;
RX-TX frequency separation;
random access related parameters;
additional spectrum emission requirement.

21. The network node of claim 18, wherein at least one of the respective frequency bands is a superset of one or more other frequency bands.

22. The network node of claim 18, wherein a first frequency band of the respective frequency bands is a sub-band of a second frequency band of the respective frequency bands.

23. The network node of claim 18, wherein determining which at least two frequency bands to support is further based on historical data or statistics related to frequency bands used by UEs in at least part of the network.

24. The network node of claim 18, wherein at least one of the respective frequency bands is associated with legacy equipment.

25. The network node of claim 18, wherein at least one of the respective frequency bands is not associated with legacy equipment.

26. The network node of claim 18, wherein the cell is operated in one frequency band FO and is further configured to support also at least part of another one, FA, of the respective frequency bands, wherein at least part of frequency band FA consists of frequencies which are also comprised in the frequency band FO in which the cell is operated.

27. The network node of claim 18, wherein the processing circuitry is further configured to signal the information associated with the at least two frequency bands to a UE in one or more system information blocks (SIBs) over a broadcast channel.

28. The network node of claim 27, being adapted to function according to the Radio Access technology (RAT) Long-Term Evolution (LTE); and wherein the UE is in idle mode.

29. The network node of claim 27, being adapted to function according to the Radio Access technology (RAT) Universal Mobile Telecommunications System (UMTS) and wherein the UE is in one of the possible low activity states:
idle mode, URA_PCH state, CELL_PCH state or CELL_FACH state.

30. The network node of claim 18, wherein the processing circuitry is further configured to signal the information associated with the at least two frequency bands to a UE in one or more system information blocks (SIBs) over a UE specific channel.

31. The network node of claim 30, wherein the UE is in connected or active state.

32. The network node of claim 18, wherein the network node is any of:
eNode B, base station, Node B, BTS, radio network controller, base station controller, positioning node, core network node, any type of network controller, relay node, donor node serving relay, donor base station, donor Node B, donor eNode B, another relay node in a multi-hop relaying system, donor radio network controller and donor base station controller.

33. The network node of claim 18, wherein the processing circuitry is further configured to signal the information associated with the at least two frequency bands to at least one other network node.

34. The network node of claim 33, wherein the at least one other network node is any of: base station, Node B, eNode B, BTS, radio network controller, base station controller, positioning node, core network node, any type of network controller, relay node, donor node serving relay, donor base station, donor Node B, donor eNode B, another relay node in a multi-hop relaying system, donor radio network controller, donor base station controller.

* * * * *